(12) United States Patent
Beckmann et al.

(10) Patent No.: US 7,729,349 B2
(45) Date of Patent: Jun. 1, 2010

(54) METHOD OF TRANSMITTING DATA IN A COMMUNICATION SYSTEM

(75) Inventors: Mark Beckmann, Braunschweig (DE); Thomas Gottschalk, Berlin (DE); Andreas Otte, Celle (DE); Michael Eckert, Braunschweig (DE); Martin Hans, Hildesheim (DE); Norbert Schwagmann, Lehe (DE)

(73) Assignee: Siemens Aktiengesellschaft, Munich (DE)

( * ) Notice: Subject to any disclaimer, the term of this patent is extended or adjusted under 35 U.S.C. 154(b) by 1251 days.

(21) Appl. No.: 10/212,532

(22) Filed: Aug. 5, 2002

(65) Prior Publication Data
US 2003/0035423 A1     Feb. 20, 2003

(30) Foreign Application Priority Data

| Aug. 7, 2001 | (EP) | ................................. 01710039 |
| Nov. 6, 2001 | (EP) | ................................. 01126315 |

(51) Int. Cl.
*H04L 12/56* (2006.01)

(52) U.S. Cl. ...................... 370/390; 370/328; 370/329; 370/338; 370/349; 370/466; 370/469; 455/466

(58) Field of Classification Search ................. 370/328, 370/349, 390, 469, 329, 338, 466; 455/466
See application file for complete search history.

(56) References Cited

U.S. PATENT DOCUMENTS

| 5,341,375 | A | | 8/1994 | Buchholz et al. | |
| 5,864,684 | A | | 1/1999 | Nielsen | ................... 395/200.36 |
| 6,052,709 | A | | 4/2000 | Paul | ............................ 709/202 |
| 6,091,961 | A | * | 7/2000 | Khalil | ......................... 455/466 |
| 6,480,480 | B1 | * | 11/2002 | Du | ............................. 370/338 |
| 6,480,885 | B1 | | 11/2002 | Olivier | ........................ 709/207 |
| 6,714,987 | B1 | * | 3/2004 | Amin et al. | .................. 709/249 |
| 6,717,925 | B1 | * | 4/2004 | Leppisaari et al. | ........... 370/312 |
| 6,721,785 | B1 | | 4/2004 | Raghunandan | ............... 709/206 |
| 6,791,963 | B1 | * | 9/2004 | Hwang et al. | ................ 370/342 |
| 6,848,008 | B1 | | 1/2005 | Sevanto et al. | ............... 709/249 |

(Continued)

FOREIGN PATENT DOCUMENTS

EP     0306781     8/1988

(Continued)

OTHER PUBLICATIONS

D.H. Crocker; "Standard For The Format of ARPA Internet Text Messages"; www.faqs.org/rfc822.html ; Aug. 13, 1982; RFC # 822; pp. 42, Jan. 28, 2009.

(Continued)

*Primary Examiner*—William Trost, IV
*Assistant Examiner*—Toan D Nguyen
(74) *Attorney, Agent, or Firm*—King & Spalding L.L.P.

(57) ABSTRACT

A method of transmitting data from a sender to a number of recipients in a system with a multilayer protocol architecture, in which the data are divided for organizational purposes into data packets having header data and payload data, a transmitting and/or receiving unit and a communication system. The transmission of data in the form of a point-to-multipoint transmission over a general channel, in particular in a mobile radio system, is carried out by adding to packet data which are being sent to multicast groups control data for the identification of a specific multicast group.

10 Claims, 2 Drawing Sheets

U.S. PATENT DOCUMENTS

| | | | |
|---|---|---|---|
| 6,892,909 B1 | 5/2005 | Herbert et al. | 222/637 |
| 6,965,580 B1* | 11/2005 | Takagi et al. | 370/312 |
| 7,307,968 B2* | 12/2007 | Niemela et al. | 370/329 |
| 2001/0055298 A1* | 12/2001 | Baker et al. | 370/349 |
| 2002/0080854 A1* | 6/2002 | Rebhan et al. | 375/132 |
| 2002/0107925 A1 | 8/2002 | Goldschneider et al. | 709/206 |

FOREIGN PATENT DOCUMENTS

| | | |
|---|---|---|
| EP | 0 993 148 | 4/2000 |
| EP | 1 071 296 | 1/2001 |
| JP | 2000049849 | 2/2000 |
| WO | WO 99/08457 | 2/1999 |

OTHER PUBLICATIONS

Office Action from U.S. Patent Application Publication No. 2004/0066778 (9 pages), Mailing Date: Dec. 16, 2008.
Office Action from U.S. Patent Application Publication No. 2004/0066778 (8 pages), Mailing Date: Apr. 30, 2008.
Office Action from U.S. Patent Application Publication No. 2004/0066778 (9 pages), Mailing Date: Sep. 20, 2007.
Office Action from U.S. Patent Application Publication No. 2004/0066778 (7 pages), Mailing Date: Apr. 2, 2007.
XP-002191629—3$^{rd}$ Generation Partnership Project: Technical Specification Group Radio Access Network; Radio Interface for broadcast/multicast services 1999.
XP-002192128—Chapter 6 WCDMA pp. 171-205, Jun. 2001.

* cited by examiner

METHOD OF TRANSMITTING DATA IN A COMMUNICATION SYSTEM

BACKGROUND OF THE INVENTION

The present invention relates to a method of transmitting data from a sender to a number of recipients in a system with a multilayer protocol architecture, in which the data are divided for organizational purposes into data packets having header data and payload data, a transmitting and/or receiving unit and a communication system.

The term data is understood within the present invention to refer to not only any form of information and/or message but also information which is essentially promotional or unsolicited; that is, in particular, an offer, an advertisement or promotion for a product innovation and consumer information in some other form.

In the case of many services and applications offered in known modern communication systems, information is to be transmitted not only to one mobile radio user but also to two or more mobile radio users. Examples of such services and applications are newsgroups on the Internet, video conferences, video on demand, distributed applications and many more. When messages are transmitted to various users, it is possible to send a copy of the data separately to each recipient. Although this technique is simple to implement using what are known as unicast connections, it is unsuitable for large groups. Since, when sending to N recipients, the same message is essentially transmitted over N individual connections and, in the process, sent repeatedly over common connection paths, this method requires a very high bandwidth.

The present invention is, therefore, directed toward providing a method, a transmitting and/or receiving unit and a communication system which make it possible to send messages to a targeted group of recipients without significant additional administrative effort and with a low transmission bandwidth requirement.

SUMMARY OF THE INVENTION

A method according to the present invention is distinguished by the fact that the transmission of data in the form of a point-to-multipoint transmission, in particular in a mobile radio system, is carried out by adding to packet data which are being sent to multicast groups control data for the identification of a specific multicast group. In this way, according to the present invention, a message transmission intended only for a specific group is sent only once to conserve system resources. Although the transmission path over a general channel allows all mobile radio users or mobile radio stations which can possibly be reached to receive this message transmission, it is read only by members of a desired group, since, according to the present invention, it is identified for this group.

In an embodiment, a multicast group is identified by added control data, so that the mobile radio stations find out to which multicast group a specific data packet has been sent. Consequently, a control, or additional monitoring, of the data flows is achieved in a simple way and is not required outside the mobile radio stations as user terminals.

Preferably, using UMTS or a similar standard, further processing of the data received is instigated in a control layer MAC of a receiving mobile radio station on the basis of a comparison of added control data with a multicast group number of its own only if the numbers coincide. This conserves resources in the receivers by preventing further processing of information which is not intended for the respective recipient outside a specific group, and is consequently also generally not readable.

The control data are preferably added in a control layer of the sender. In a known multilayer protocol architecture, this is in particular the MAC layer. Consequently, a respective control layer in the transmitter and at the receivers, here what is known as the MAC layer, is entrusted with the task of processing, i.e. adding or analyzing, control data according to the present invention. This is particularly meaningful, since the MAC layer already has the task of identifying mobile radio telephones in the case of packet data transmissions on general channels. It can therefore be extended according to the present invention without any problems.

The data packets for multicast or enhanced broadcast are transmitted over the already existing transport channel, in particular the transport channel FACH, using a new logical channel.

Alternatively, the data packets for multicast or enhanced broadcast are transmitted over a combination already used or known in a data transmission system from a logical channel which is also projected onto a transport channel FACH. Preferably, the logical channel and a transport channel assigned in accordance with standard requirements, for example DTCH, is used for this. In a further embodiment, the data packets for multicast or enhanced broadcast are transmitted over an already used combination of the logical channel DTCH, projected onto a transport channel DSCH.

In an alternative embodiment, the data packets for multicast or enhanced broadcast are transmitted over a new transport channel, which is given for example the name MCH.

In a particularly advantageous way, the method is performed in accordance with the UMTS standard. Consequently, a forthcoming mobile radio system is equipped with resource-conserving mechanisms in a way compatible with a standard stipulated to this extent. Among applications which can be used, including under UMTS, are promotional transmissions, announcements from information groups through to a transmission of services such as are known from the broadcast sector. Then, devices in the form of transmitting and/or receiving units or communication systems can also be achieved, utilizing the advantages mentioned above.

Additional features and advantages of the present invention are described in, and will be apparent from, the following Detailed Description of the Invention and the Figures.

DETAILED DESCRIPTION OF THE INVENTION

Figure 1:
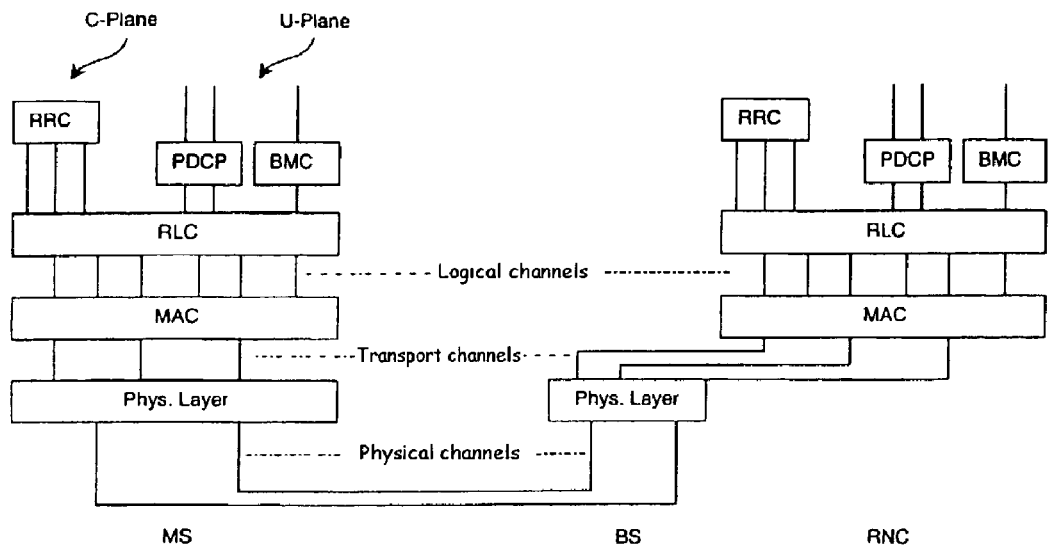
FIG. 1 shows a protocol architecture, as specified currently in the Universal Mobile Telecommunication System UMTS, in a sketched representation.

The illustration of FIG. 1 shows a protocol architecture as currently specified in the Universal Mobile Telecommunication System UMTS, on the basis of the example of a transmission of data from a radio network control unit or radio network controller RNC via a base station BS to a mobile radio station MS, or vice versa. The protocol stack in the UMTS is subdivided into the physical layer, the data link layer and the network layer. The data link layer breaks down into the Medium Access Control MAC, Radio Link Control RLC, Packet Data Convergence Protocol PDCP and Broadcast/Multicast Control BMC sublayers. In the vertical direction, the protocol architecture is subdivided into two planes: the control plane or C-Plane and the user plane or U-Plane. In this arrangement, the protocol layers including the physical layer, Medium Access Control MAC and Radio Link Control RLC are used by both planes. The physical layer is located in the mobile radio station MS and, on the network side, in the base station BS. It is responsible for how the data are sent over the physical channels between the network and the mobile radio telephone MS. Among the responsibilities of the physical layer are error protection and the multiplexing of logical transport channels onto the physical channels.

The actual transmission of all the data consequently takes place over what are known as the physical channels. Among the physical channels, a distinction is drawn between general channels and dedicated channels. The general channels may, in this case, be used by a number of mobile radio stations at the same time, whereas only data for a specific mobile radio station are transmitted on the dedicated channels.

Above the physical layer there is the MAC layer. On the network side, the MAC layer is in the Radio Network Controller RNC control unit of the radio network. One task of the MAC layer is, for example, to multiplex the logical channels above the MAC layer onto the transport channels below the MAC layer. Furthermore, the MAC layer is responsible for the identification of the users if data are sent on shared channels. The physical layer is then connected to the MAC layer via the transport channels. On the transmitter side, the MAC layer in this case passes on the data via these transport channels to the physical layer, which sends the data packets over the physical channels. On the receiving side, the data packets are then passed on by the physical layer to the MAC layer over the transport channels.

Above the MAC layer there is the RLC layer, one of the tasks of which is the segmentation or assembly of packet data, data flow control and the provision of automatic requests to repeat a transmission, or Automatic Repeat Request (ARQ) mechanisms. The RLC layer is connected to the MAC layer via logical channels. The logical channels in this case indicate which type of data are to be transported, a distinction being made, for example, between control data and payload data.

Above the RLC there is then, in the control layer C-Plane, what is known as the Radio Resource Control or RRC layer, which is responsible, for example, for the allocation of resources.

In the user plane U-Plane, above RLC, there are also the Broadcast/Multicast Control or BMC layer and the Packet Data Convergence Protocol or PDCP layer. These are currently arranged in parallel. The BMC layer is responsible for the control of the Cell Broadcast Service or CBS service. One of the responsibilities of the PDCP layer is the compression of control data, known as header compression.

The layers RLC, RRC, PDCP and BMC are not particularly significant for the present invention. They have only been presented to provide a complete representation of the layer model according to FIG. 1, and are therefore not considered any further.

Figure 2:
FIG. 2 represents a data packet which is passed on from the MAC layer in the RNC via a general transport channel or Forward Access Channel FACH to the physical layer.

If, according to the prior art, packet data are sent over general channels, in particular from a network or UMTS Terrestrial Radio Access Network, UTRAN for short, to a mobile radio station, the MAC layer adds control data to the data packet in the Radio Network Controller RNC. On the basis of these control data, the MAC layer can detect in a receiver, that is a mobile radio station, whether or not the data packets are intended for it. The illustration of FIG. 2 shows a data packet which is passed on by the MAC layer in the RNC over a General Transport Channel or Forward Access Channel FACH to the physical layer if data are to be sent over a selected logical channel or Dedicated Traffic Channel DTCH from the RNC to a specific user terminal UE.

Within the control data, a TCTF field indicates over which type of logical channel the MAC layer has received the data packets if they are to be passed on via a general transport channel FACH to the physical layer. Table 1 presents the TCTF values for the general transport channel FACH:

TABLE 1

| TCTF | Coding |
|---|---|
| 00 | BCCH |
| 01000000 | CCCH |
| 01000001-01111111 | Reserved (packet data units with this coding are rejected in this version of the protocol) |
| 10000000 | CTCH |
| 10000001-10111111 | Reserved (packet data units with this coding are rejected in this version of the protocol) |
| 11 | DCCH or DTCH via FACH |

Possible logical channels which can be transmitted via FACH are accordingly:
  BCCH: Broadcast Control Channel
  CCCH: Common Control Channel
  DCCH: Dedicated Control Channel
  DTCH: Dedicated Transport Channel
  CTCH: Common Traffic Channel Some values of the field TCTF have so far not yet been occupied. A C/T field, likewise represented in FIG. 2, is used for the multiplexing/demultiplexing, but has no further significance for the present invention.

The field "UE-ID type" indicates which identity is being used for the identification of the mobile radio station. In principle, this field consequently indicates the size of the "UE-ID" field. The UE-ID type field includes 2 bits, with 2 values so far not occupied, as table 2 shows:

TABLE 2

| UE-ID type 2-bit field | UE identification type |
|---|---|
| 00 | U-RNTI |
| 01 | C-RNTI |
| 10 | Reserved (packet data units with this coding are rejected in this version of the protocol) |
| 11 | Reserved (packet data units with this coding are rejected in this version of the protocol) |

In the field "UE-ID", the actual identity of the mobile radio station for which the data are being transmitted is transmitted. A Cell Radio Network Temporary Identifier C-RNTI and a User Radio Network Temporary Identifier U-RNTI are consequently the types of identities of the mobile radio stations possible here. C-RNTI in this case has a length of 16 bits, U-RNTI is 32 bits long.

The data packet is then transmitted over general physical channels, such as the Secondary Common Control Physical Channel S-CCPCH, to all the mobile radio stations within a cell. Each mobile radio station then passes the data packets on over the general transport channel FACH to the MAC layer. The MAC layer firstly analyzes the field "UE-ID type" and determines from it which type of mobile radio station identity was used. Subsequently, the MAC layer reads from the field "UE-ID" the identity of the mobile radio station for which the data packet was intended. The MAC layer compares this identity with the actual identity. If the identities coincide, the data packet is passed via the corresponding logical channel to the RLC layer. If the identities do not coincide, the data packet is rejected and erased from all the memories.

Within the method described above, a multiplexed dispatch or dispatch of messages from one sender to a defined group of recipients is still not possible. Currently, what is known as a multicast service is specified for the UMTS. In this service, users can log on for a specific group via their mobile radio station. They are then sent data packets intended for this group. To keep the volume of data sent within a cell as small as possible, it is desirable to send the packets over a shared channel to all the users and/or mobile radio stations of this group. When doing so, it must be noted that a number of different groups may be offered in one cell, but not all the users and/or mobile radio stations in the cell belong to all the groups at the same time.

For the present invention it is further assumed that data packets for different groups are to be transmitted over the same shared physical channel and transport channel.

A key to the present invention is the adding of control data to packet data which are being sent to multicast groups. The control data are intended, according to the present invention, to identify the multicast group in order to enable the mobile radio stations to find out to which group a specific data packet has been sent.

In particular, it is intended, according to an embodiment of the present invention, for the MAC layer to add these control data. This is particularly meaningful, since the MAC layer already has the task of identifying mobile radio telephones in the case of packet data transmissions on general channels, as described above.

After reception of a data packet which has been sent to a multicast group, according to the present invention the mobile radio stations will check on the basis of the identification of the multicast group sent at the same time in the control information whether the packet was sent to a multicast group to which the mobile radio station belongs. If the mobile radio station does not belong to the corresponding multicast group, the mobile radio station is intended, according to the present invention, to erase the data packet. To relieve the receivers, a mobile radio station will only pass on the data packet to the higher layer RLC if this mobile radio station belongs to the corresponding multicast group.

Within the present invention, a distinction is made in principle between three cases for the implementation of this method:

1. The data packets for multicast or enhanced broadcast are transmitted over the already existing transport channel FACH.
2. The data packets for multicast or enhanced broadcast are transmitted over the already used combination of the logical channel DTCH, projected onto FACH, or the already used combination of the logical channel DTCH, projected onto DSCH.
3. The data packets for multicast or enhanced broadcast are transmitted over a previously non-existent transport channel MCH.

Re: Case 1:

For this exemplary embodiment, it is assumed that the mobile radio stations MS1 and MS2 belong to the multicast group A and the mobile radio stations MS3 and MS4 belong to the group B. It is also assumed that the packet data for both groups are transmitted over the same general physical channel S-CCPCH and that the physical layer of the mobile radio stations passes the packet data on over the general transport channel FACH to the MAC layer. For this case, data can also be sent via the FACH to individual mobile radio stations.

Figure 3:
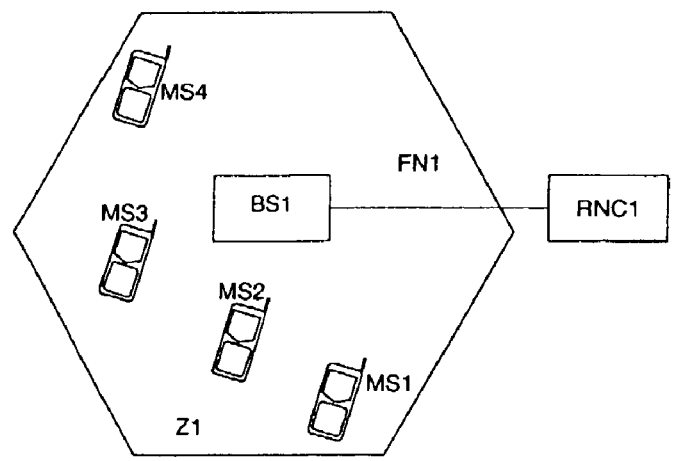
FIG. 3 shows in sketched form a network setup with a cell defined by a base station and with a number of mobile radio users, which belong to different groups.

The network setup is represented in the illustration of FIG. 3. The control unit RNC of the radio network is connected via a fixed network connection FN1 to a base station BS1. The base station BS1 defines a cell Z1, in which mobile radio stations MS1-4 are located. The mobile radio stations MS1-4 are connected via the already mentioned general physical channel S-CCPCH to the base station BS1.

Figure 4:
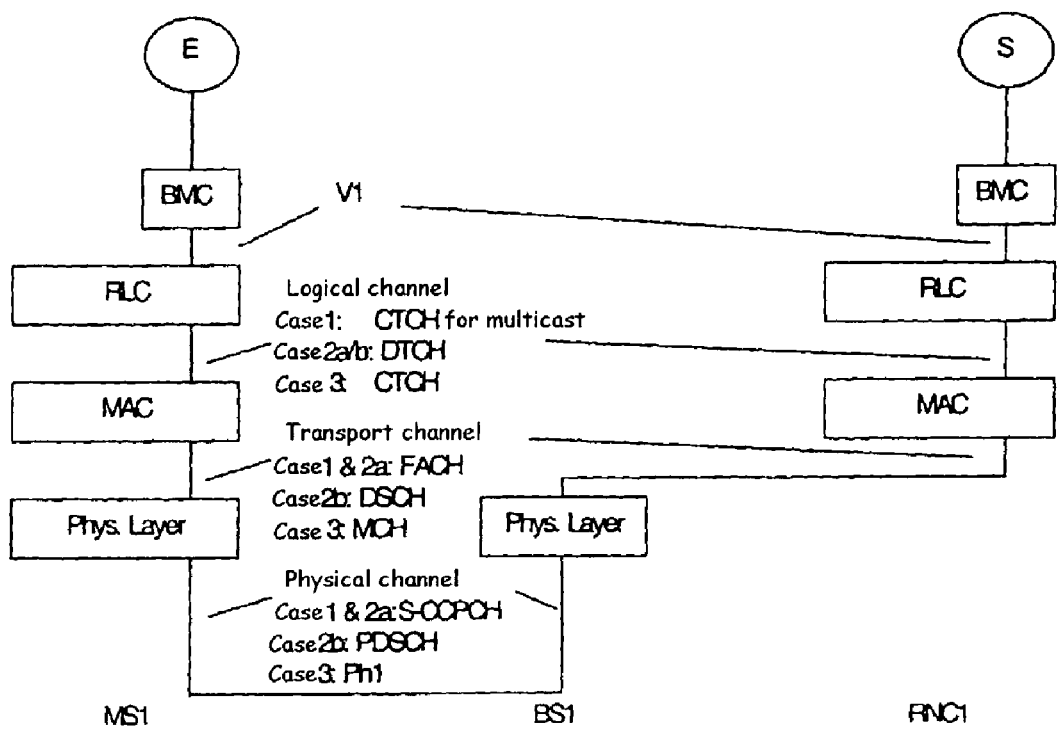
FIG. 4 represents by way of example, in a way analogous to the representation of FIG. 1, a protocol configuration of the components of the network setup from FIG. 3 with a mobile radio station.

It is now assumed that a data packet is to be sent to the multicast group A. In the illustration of FIG. 4, the protocol configuration of RNC1, BS1 and the mobile radio stations is shown. For the sake of simplicity, only MS1 is represented, since all the mobile radio stations have the same configuration. The data packet is passed in RNC1 from the BMC layer via a connection V1 to the layer RLC lying under it. A packet which a layer receives from a higher layer is, in this case, generally referred to as a Service Data Unit SDU. On the other hand, a packet which is passed from a layer to a layer lying under it is generally referred to as a Packet Data Unit PDU. The RLC layer possibly processes the RLC-SDU before the data packet is passed on to the MAC layer as an RLC-PDU via a logical channel for the transmission of multicast messages MC-CTCH1. The RLC-PDU consequently corresponds to the MAC-SDU. Then, according to the present invention, the MAC layer adds control data to the MAC-SDU, with the aid of which data the receivers can determine for which multicast group the data packet is intended.

Figure 5:
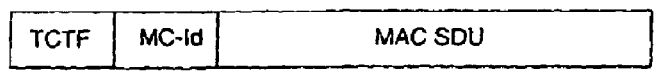
FIG. 5 shows a data packet with control data fields.

The MAC-PDU is represented in the illustration of FIG. 5 and includes the packet which the MAC layer has received from the RLC layer, that is MAC-SDU, and control data fields "TCTF" and "MC-ID". The TCTF field indicates from which type of logical channel the data are being transmitted. According to the present invention, the value range of the TCTF field is to be extended in such a way that it is possible to distinguish whether the logical channel is being used for the transmission of multicast or enhanced broadcast. In this exemplary embodiment, it is intended for the TCTF to be set to "CTCH for Multicast". On the basis of this information, the receiving mobile radio station later detects which control data have been added to the MAC-SDU. This new property is particularly advantageous, since data which is sent over other logical channels can be sent over the same transport channel FACH. For example, data packets according to FIG. 2, which have been passed on over logical channels such as the DTCH or DCCH to the MAC layer, can likewise be sent over the FACH. Which type of control data have been added in this case to the MAC-SDU can be detected by the receiving mobile radio stations on the basis of the TCTF field.

According to the present invention, the "MC-ID" field contains the information by which the multicast group can be identified. If there are several possibilities for the identification of the multicast group, a further field "MC-ID type" may be additionally added, indicating the type of multicast group identification. This may be meaningful, for example, if a multicast group can be identified either via a UMTS-specific identity or, alternatively, addressing according to the Internet protocol IP can be used. Furthermore, according to the present invention, the "MC-ID type" field may also simply indicate the length of the "MC-ID" field; for example, if only data for two multicast groups are being transmitted over the same general physical and transport channel, an "MC-ID" field of 1 bit would be adequate, whereas, for three or four multicast groups, an "MC-ID" field of 2 bits in length would be necessary, etc.

For this exemplary embodiment, it is assumed hereafter that the "MC-ID" field is always of the same length and that there is only one type of identification, and the field "MC-ID type" is consequently not used. It is, therefore, also not represented in the illustration of FIG. 5.

The MC-PDU is then passed on over the general transport channel FACH for the transmission of multicast data to the physical layer, which sends the data packet over the general physical channel S-CCPCH to the mobile radio stations MS1-MS4. Each of the 4 mobile radio stations receives the data packet on the general physical channel and passes the packet on over the general transport channel FACH to the MAC layer, as represented in the illustration of FIG. 5. The MAC layer of the mobile radio stations then deduces from the field TCTF that the data must be passed on via a CTCH for the transmission of multicast data to RLC, and, according to the present invention, detects from this that the TCTF field is followed by the "MC-ID" field. The MAC layer deduces from the field "MC-ID" the multicast group to which this packet was sent and compares it with the multicast group identity stored in the mobile radio station.

The mobile radio stations MS1 and MS2 belong to the multicast group A, to which the data packet was also sent. MS1 and MS2 were notified of the multicast group identity for the multicast group A when logging onto the multicast group A or, if the multicast group identity is restricted to certain areas (for example a number of cells), on entry into the corresponding area. The same applies to MS3 and MS4, which however were notified of the multicast group identity B. According to the present invention, MS1-4 then compare the multicast group identity contained in the data packet with the stored identity. MS1 and MS2 establish that the same identity is concerned and remove the MC-ID field before the MAC-SDU is passed on via the logical channel MC-CTCH1 to the RLC layer. MS3 and MS4 establish that the multicast group identity contained in the data packet does not coincide with the stored identity and, according to the present invention, erase the data packet instead of passing it on to the RLC layer. The RLC layers in MS1 and MS2 subsequently pass on the data packet via the connection V1 to the BMC layer, which finally passes it on to the higher layers.

Re: Case 2:

It is again assumed that the mobile radio stations MS1 and MS2 belong to the multicast group A and the mobile radio stations MS3 and MS4 belong to the group B. Using the logical channel DTCH, two variants are now investigated:

For variant a) of this exemplary embodiment it is assumed that the data packets for both groups are transmitted over the same general physical channel S-CCPCH1 and that the physical layer of the mobile radio stations passes the packet data on via the general transport channel FACH1 to the MAC layer. Here it is possible, for example, to send data to individual mobile radio stations.

For variant b) of this exemplary embodiment it is assumed that the packet data for both groups are transmitted over the same general physical channel or Physical Downlink Shared Channel PDSCH and that the physical layer of the mobile radio stations passes the packet data on via the general transport channel or Downlink Shared Channel DSCH to the MAC layer. In this case, too, it is possible, for example, also to send data to individual mobile radio stations.

The network setup is represented in the illustration of FIG. 3. The radio network control unit RNC is connected via a fixed network connection FN1 to the base station BS1, which defines the cell Z1, in which the mobile radio stations MS1-4 are located. The mobile radio stations MS1-4 are connected according to variant a) via the already mentioned general physical channel S-CCPCH or according to variant b) via the physical channel PDSCH to the base station BS1.

It is now assumed that a data packet is to be sent to the multicast group A. In FIG. 4, the protocol configuration of RNC1, BS1 and the mobile radio stations is shown. Since all the mobile radio stations have the same configuration, for the sake of simplicity only MS1 is represented. The data packet is passed in RNC1 from the BMC layer via a connection V1 to the layer RLC lying under it. The RLC layer then possibly processes the RLC-SDU again before the data packet is passed on to the MAC layer as an RLC-PDU via the logical channel Dedicated Traffic Channel DTHH. FIG. 2 shows the MAC-PDU, as it is passed on to the physical layer, when the DTCH is projected onto the general transport channel FACH. In the case where the DTCH is projected onto the DSCH, the field "TCTF" is not present, since only DTCH and DCCH are transmitted on this transport channel, for which the MAC-PDU always looks the same.

According to the present invention, the value range of the field "UE-ID type" has been extended by a further value "MC-ID", which indicates that the address in the "UE-ID" field does not concern an identity of a mobile radio station but an identification of a multicast group. The field "UE-ID type" is then set to this new value and an identification for the multicast group A is entered in the field "UE-ID".

Only in the case of variant a) does the TCTF field indicate as before that the logical channel over which the MAC layer has received the data packet is a DTCH. The C/T field is not used in this exemplary embodiment, since it is assumed that only one logical channel is projected onto the FACH or DSCH and consequently no multiplexing information is necessary.

If there are several possibilities for the identification of the multicast group, the second not yet occupied value of the field UE-ID type could also be additionally used.

For this exemplary embodiment, however, it is assumed hereafter that only one value is used. The MC-PDU is then passed on in variant a) via the general transport channel FACH, in variant b) via the DSCH, for the transmission of multicast data to the physical layer, which sends the data packet over the general physical channel S-CCPCH to the mobile radio stations MS1-MS4. Each of the four mobile radio stations receives the data packet on the general physical channel and passes the packet on over the general transport channel FACH or DSCH to the MAC layer, as represented in the illustration of FIG. 2. For variant a), the MAC layer of the mobile radio stations then deduces from the field TCTF that the data must be passed on via a DTCH for the transmission of multicast data to RLC, and detects from this that the TCTF field is followed by the "UE-ID type" field. For variant b), the MAC layer of the mobile radio station knows that the MAC-PDU begins with the field "UE-ID type."

The MAC layer establishes through the field UE-ID type that the field "UE-ID" contains an identification of a multicast group. The MAC layer then deduces from the field "UE-ID" the multicast group to which this packet was sent. Then the MAC layer compares the field value with the multicast group identity stored in the mobile radio station. The mobile radio stations MS1 and MS2 belong to the multicast group A, to which the data packet was also sent. MS1 and MS2 were notified of the multicast group identity for the multicast group A when logging onto the multicast group A or, if the multicast group identity is restricted to certain areas (for example, a number of cells), on entry into the corresponding area. The same applies to MS3 and MS4, which, however, were notified of the multicast group identity B. According to the present invention, MS1-4 then compare the multicast group identity contained in the data packet with their own stored identity. MS1 and MS2 establish that the same identity is concerned and remove all the control data before the MAC-SDU is passed on via the logical channel DTCH to the RLC layer. MS3 and MS4 establish that the multicast group identity contained in the data packet does not coincide with the stored identity. According to the present invention, MS3 and MS4 erase the data packet instead of passing it on to the higher RLC layer.

The RLC layers in MS1 and MS2 subsequently pass on the data packet via the connection V1 to the BMC layer, which finally passes it on to the higher layers.

Re: Case 3:

It is also again assumed for this exemplary embodiment that the mobile radio stations MS1 and MS2 belong to the multicast group A and the mobile radio stations MS3 and MS4 belong to the group B. It is also assumed that the packet data for both groups are transmitted over the same general physical channel Ph1 and that the physical layer of the mobile radio stations passes the packet data on over a previously non-existent general transport channel to the MAC layer. In this case, the configuration of the general physical channel and of the transport channel are to be made known only to those mobile radio stations which belong to one or more multicast groups. Consequently, mobile radio stations which do not belong to at least one multicast group do not receive the data packets for multicast groups.

The network setup is the same as in the previous cases. The mobile radio stations MS1-4 are connected via the already mentioned general physical channel Ph1 to the base station BS1. It is then also assumed that a data packet is to be sent to the multicast group A. In FIG. 4, the protocol configuration of RNC1, BS1 and the mobile radio stations is shown. Since all the mobile radio stations have the same configuration, for the sake of simplicity, only MS1 is represented.

Figure 6:
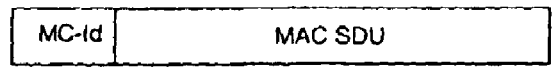
FIG. 6 represents a data packet of a further embodiment of the present invention with control data fields.

The data packet is passed in RNC1 from the BMC layer via a connection V1 to the layer RLC lying under it. The RLC layer possibly processes the RLC-SDU before the data packet is passed on to the MAC layer as an RLC-PDU via a logical channel, in this exemplary embodiment the CTCH. The RLC-PDU consequently corresponds to the MAC-SDU. Then, according to the present invention, the MAC layer adds control data to the MAC-SDU, with the aid of which data the receivers can determine for which multicast group the data packet is intended. The MAC-PDU is represented in the illustration of FIG. 6 and includes the packet which the MAC layer has received from the RLC layer, MAC-SDU, and the control data field "MC-ID". The control data field "MC-ID" contains the information by which the multicast group can be identified.

If there are several possibilities for the identification of the multicast group, here, too, a further field "MC-ID type" may again be additionally added. For this exemplary embodiment, however, it is again assumed hereafter that the "MC-ID" field is always of the same length and that there is only one type of identification, and the field "MC-ID type" is consequently not used. Since for this case a new transport channel is used for the transmission of multicast data packets, onto which only the CTCH is projected, it is not necessary to identify the logical channel; for example with the TCTF field.

The MC-PDU is then passed on via a general channel for the transmission of multicast data packets, in this exemplary embodiment multicast channel MCH, to the physical layer, which sends the data packet over the general physical channel Ph1 to the mobile radio stations MS1-MS4. Each of the four mobile radio stations receives the data packet on the general physical channel and passes the packet, as represented in the illustration of FIG. 6, on over the general transport channel MCH to the MAC layer.

The MAC layer of the mobile radio stations then deduces from the field MC-ID the multicast group to which this packet was sent and compares it with the multicast group identity stored in the mobile radio station. The mobile radio stations MS1 and MS2 belong to the multicast group A, to which the data packet was also sent. MS1 and MS2 were notified of the multicast group identity for the multicast group A when logging onto the multicast group A or, if the multicast group identity is restricted to certain areas (for example a number of cells), on entry into the corresponding area. The same applies to MS3 and MS4 which, however, were notified of the multicast group identity B.

According to the present invention, the mobile stations MS1-4 then compare the multicast group identity contained in the data packet with the stored identity. MS1 and MS2 establish that the same identity is concerned and remove the MC-ID field before the MAC-SDU is passed on via the logical channel CTCH to the RLC layer. MS3 and MS4 establish that the multicast group identity contained in the data packet does not coincide with the stored identity and, according to the present invention, erase the data packet instead of passing it on to the RLC layer. The RLC layers in MS1 and MS2 subsequently pass on the data packet via the connection V1 to the BMC layer, which finally passes it on to the higher layers.

Although the present invention has been described with reference to specific embodiments, those of skill in the art will recognize that changes may be made thereto without departing from the spirit and scope of the invention as set forth in the hereafter appended claims.

The invention claimed is:

1. A method of transmitting data from a sender to a number of recipients in a system with a multi-layer protocol architecture, the method comprising the steps of:
    organizing the data into divided data packets comprising header data and payload data;
    adding multicast group control data to the data packets in a control layer of the sender's multi-layer protocol architecture, wherein the control data identifies a multicast group within the recipients to which the data will be sent;
    transmitting the data to a mobile radio system using point-to-multipoint transmission over a general channel in a mobile radio system;
    processing the data in a Medium Access Control (MAC) layer of a receiving mobile radio station by comparing the added multicast group control data with a multicast group number of the receiving mobile radio station;

if the added multicast group control data corresponds to the multicast group number of the receiving mobile radio station, removing the multicast group control data from a corresponding data packet and passing the corresponding data packet to a higher protocol layer in the multi-layer protocol architecture; and if the added multicast group control data does not correspond to the multicast group number of the receiving mobile radio station, erasing the data packet without passing the data packet to the next protocol layer.

2. The method of transmitting data as claimed in claim 1, the method further comprising the step of:

adding the control data in a Medium Access Control (MAC) control layer of the sender.

3. The method of transmitting data as claimed in claim 1, wherein the data packets are transmitted over an already existing transport channel FACH (Forward Access Channel) using a new logical channel.

4. The method of transmitting data as claimed in claim 1, wherein the data packets are transmitted over an already used combination from a logical channel DTCH (Dedicated Traffic Channel), projected onto a transport channel FACH (Forward Access Channel).

5. The method of transmitting data as claimed in claim 1, wherein the data packets are transmitted over an already used combination of a logical channel DTCH (Dedicated Traffic Channel), which is projected onto a transport channel DSCH (Down-Link Shared Channel).

6. The method of transmitting data as claimed in claim 1, wherein the data packets are transmitted over a new transport channel MCH (Multicast Channel).

7. The method of transmitting data as claimed in claim 1, wherein the method is performed in accordance with the UMTS standard.

8. A unit for mobile transmission of data on at least one of a fixed network and another mobile transmission unit, wherein the unit transmits the data from a sender to a number of recipients in a system with a multilayer protocol architecture, the unit comprising:

a part that organizes the data into divided data packets comprising header data and payload data;

a part that adds multicast group control data to the data packets in a control layer of the multi-layer protocol architecture of the unit, wherein the control data identifies a multicast group within the recipients to which the data will be sent;

a part that transmits the data to a mobile radio system using point-to-multipoint transmission over a general channel in the mobile radio system such that the mobile radio system processes the transmitted data by comparing the added multicast group control data with a multicast group number of the mobile radio system, and removes the multicast group control data from a corresponding data packet before passing the corresponding data packet to a higher protocol layer in the multilayer protocol architecture if the added multicast group control data corresponds to the multicast group number of the mobile radio system; and erases the data packet without passing the data packet to the next protocol layer if the added multicast group control data does not correspond to the multicast group number of the receiving mobile radio station.

9. A communication system for transmitting data from a sender to a number of recipients in a system with a multilayer protocol architecture, the system comprising:

a part that organizes the data into divided data packets comprising header data and payload data;

a part that adds multicast group control data to the data packets in a control layer of the multi-layer protocol architecture of the sender, wherein the control data identifies a multicast group within the recipients to which the data will be sent;

a part that transmits the data to a mobile radio system using point-to-multipoint transmission over a general channel in a mobile radio system;

a part that receives the transmitted data; and a processing part that processes the received data by comparing the added multicast group control data with a multicast group number of the receiving part, wherein the processing part (a) removes the multicast group control data from a corresponding data packet and passes the corresponding data packet to a higher protocol layer in the multilayer protocol architecture if the added multicast group control data corresponds to the multicast group number of the receiving part, and (b) erases the data packet without passing the data packet to the next protocol layer if the added multicast group control data does not correspond to the multicast group number of the receiving part.

10. A communication device for receiving data sent to a number of recipients in a system with a multi-layer protocol architecture, the data being organized into divided data packets and at least one data packet comprising multicast group control data that identifies a multicast group, the device comprising a mobile unit configured to:

receive the data in a mobile radio system via point-to-multipoint transmission over a general channel in the mobile radio systems;

process the data by comparing the multicast group control data with a multicast group number of the mobile unit;

if the multicast group control data corresponds to the multicast group number of the mobile unit, remove the multicast group control data from a corresponding data packet and pass the corresponding data packet to a higher protocol layer in the multi-layer protocol architecture; and if the multicast group control data does not correspond to the multicast group number of the mobile unit, erase the data packet without passing the data packet to the next protocol layer.

* * * * *